US012574139B1

(12) United States Patent
Penuel et al.

(10) Patent No.: US 12,574,139 B1
(45) Date of Patent: Mar. 10, 2026

(54) COGNITIVE RADIO DEVICE PROVIDING RADIO FREQUENCY (RF) JAMMER CAPABILITIES BASED UPON QUADRATIC UNCONSTRAINED BINARY OPTIMIZATION (QUBO) OBJECTIVE FUNCTION AND RELATED METHODS

(71) Applicant: Eagle Technology, LLC, Melbourne, FL (US)

(72) Inventors: John Penuel, Indian Harbour Beach, FL (US); Mark D. Rahmes, Melbourne, FL (US); Michael C. Garrett, Melbourne, FL (US); Chad Lau, Melbourne, FL (US); David B. Chester, Palm Bay, FL (US)

(73) Assignee: EAGLE TECHNOLOGY, LLC, Melbourne, FL (US)

( * ) Notice: Subject to any disclaimer, the term of this patent is extended or adjusted under 35 U.S.C. 154(b) by 387 days.

(21) Appl. No.: 18/464,632

(22) Filed: Sep. 11, 2023

(51) Int. Cl.
*H04K 3/00* (2006.01)

(52) U.S. Cl.
CPC ............... *H04K 3/42* (2013.01); *H04K 3/224* (2013.01)

(58) Field of Classification Search
CPC ........... H04K 3/224; H04K 3/42; H04K 3/00; H04K 3/22; H04K 3/228; H04K 3/25; H04K 3/28; H04K 3/40; H04K 3/44; H04K 3/45; H04K 2203/10
See application file for complete search history.

(56) References Cited

U.S. PATENT DOCUMENTS

| | | | |
|---|---|---|---|
| 6,118,805 | A | 9/2000 | Bergstrom et al. |
| 8,929,936 | B2 | 1/2015 | Mody et al. |
| 8,977,576 | B2 | 3/2015 | Macready |
| 9,774,366 | B2 | 9/2017 | Webb |
| 10,965,394 | B1 | 3/2021 | Eisenman |
| 11,120,357 | B2 | 9/2021 | Zeng et al. |
| 2011/0243192 | A1 | 10/2011 | Tsakonas et al. |
| 2012/0327985 | A1 | 12/2012 | Norris |
| 2016/0329985 | A1 | 11/2016 | Coleman et al. |

(Continued)

FOREIGN PATENT DOCUMENTS

| | | |
|---|---|---|
| CA | 2866608 | 4/2015 |
| JP | 2023507139 | 2/2023 |

OTHER PUBLICATIONS

KR 102107015 B1), Um et al., Apparatus and Method for Controlling Channel of Cognitive Radio, May 2020, pp. 1-10 (Year: 2020).*

(Continued)

*Primary Examiner* — Keith Ferguson
(74) *Attorney, Agent, or Firm* — ALLEN, DYER, DOPPELT, GILCHRIST, P.A. Attorneys at Law

(57) ABSTRACT

A cognitive radio device may include a radio frequency (RF) detector operable over an RF spectrum, an RF jammer having a selectable jamming frequency window within the RF spectrum, and a controller. The controller may be configured to cooperate with the RF detector and RF jammer to detect an RF transmission, determine different Quadratic Unconstrained Binary Optimization (QUBO) inputs based upon the detected RF transmission, process the QUBO inputs with a QUBO objective function to determine a new jamming frequency window, and operate the RF jammer at the new jamming frequency window.

21 Claims, 11 Drawing Sheets

(56) References Cited

U.S. PATENT DOCUMENTS

| | | | |
|---|---|---|---|
| 2019/0021075 | A1 | 1/2019 | Tan et al. |
| 2020/0272930 | A1 | 8/2020 | Aspuru-Guzik et al. |
| 2021/0266034 | A1 | 8/2021 | Vijayasankar et al. |
| 2022/0101167 | A1 | 3/2022 | Pakhomchik et al. |

OTHER PUBLICATIONS

U.S. Appl. No. 18/464,723, filed Sep. 11, 2023 John Penuel.
U.S. Appl. No. 18/464,692, filed Sep. 11, 2023 John Penuel.
U.S. Appl. No. 17/935,308, filed Sep. 26, 2022 Rhames et al.
U.S. Appl. No. 17/935,289, filed Sep. 26, 2022 Rhames et al.
Saravanan et al. "A Quantum Method for Subchannel allocation in Device-to-Device Communication" 2021 International Conference on Rebooting Computing (ICRC), Los Alamitos, CA, USA, 2021, pp. 47-55.
Kasi et al. "A cost and power feasibility analysis of quantum annealing for NextG cellular wireless networks" arXiv preprint arXiv:2109.01465. 2021; pp. 17.
Saito et al. "Evaluating dynamic spectrum allocation using quantum annealing" IEICE Communications Express 2021: 10(9), 726-732.
Ahmed et al. "Quantum computing for artificial intelligence based mobile network optimization" In 2021 IEEE 32nd Annual International Symposium on Personal, Indoor and Mobile Radio Communications (PIMRC) (pp. 1128-1133). IEEE. pp. 6.

* cited by examiner

COGNITIVE RADIO DEVICE PROVIDING RADIO FREQUENCY (RF) JAMMER CAPABILITIES BASED UPON QUADRATIC UNCONSTRAINED BINARY OPTIMIZATION (QUBO) OBJECTIVE FUNCTION AND RELATED METHODS

TECHNICAL FIELD

This application relates to the field of communication systems, and, more particularly, to cognitive radio (CR) systems and related methods.

BACKGROUND

In some cognitive radio (CR) systems, wireless radios can detect wireless communications channels that are in use, and then switch to unused channels. This not only helps to avoid interference, but also allows the system to efficiently utilize the available radio frequency (RF) spectrum.

One problem that can arise in wireless communications systems are jammers. A typical jammer is an RF transmitter that transmits signals of a relatively high power level on the same frequency as the device being jammed. This overwhelms the receiving device, such that it is unable to properly decode the received signal. In the case of CR systems, a cognitive jammer may reactively sense channels using energy detection and jam the channel using a "detect and jam" strategy, which similarly causes disruption in the communications between the legitimate transmitter-receiver pair.

Various approaches have been developed for addressing jammers in different wireless networks, including CR systems. For example, U.S. Pat. No. 8,929,936 to Mody et al. discloses a method and system of cognitive communication for generating non-interfering transmission by conducting radio scene analysis to find grey spaces using external signal parameters for incoming signal analysis without having to decode incoming signals. The cognitive communications system combines the areas of communications, signal processing, pattern classification and machine learning to detect the signals in the given spectrum of interest, extract their features, classify the signals into types, learn the salient characteristics and patterns of the signal and predict their future behaviors. In the process of signal analysis, a classifier is employed for classifying the signals. The designing of such a classifier is initially performed based on selection of features of a signal detected and by selecting a model of the classifier.

Despite the existence of such approaches, further gains in jammer detection and mitigation may be desirable in various CR applications.

SUMMARY

A cognitive radio device may include a radio frequency (RF) detector operable over an RF spectrum, an RF jammer having a selectable jamming frequency window within the RF spectrum, and a controller. The controller may be configured to cooperate with the RF detector and RF jammer to detect an RF transmission, determine a plurality of different Quadratic Unconstrained Binary Optimization (QUBO) inputs based upon the detected RF transmission, process the QUBO inputs with a QUBO objective function to determine a new jamming frequency window, and operate the RF jammer at the new jamming frequency window.

In an example embodiment, one of the QUBO inputs corresponds to a difference between a power level associated with the RF transmitter and a power level associated with the RF transmission. In another example implementation, one of the QUBO inputs corresponds to an RF power budget for the RF jammer. In accordance with another example, the new jamming frequency window may comprise a plurality of new frequencies, and one of the QUBO inputs may correspond to a number of new frequencies.

By way of example, the controller may be configured to operate based upon a machine learning (ML) model. Furthermore, the controller may be configured to determine the plurality of different QUBO inputs based upon a hysteresis of switching of the detected RF transmission in some configurations. Also by way of example, the RF spectrum may be within the ultra-high frequency (UHF) band.

A related method for using a cognitive radio device, such as the one described briefly above, is also provided. The method may include detecting an RF transmission using the RF detector, determining a plurality of different Quadratic Unconstrained Binary Optimization (QUBO) inputs based upon the detected RF transmission, processing the QUBO inputs with a QUBO objective function to determine a new jamming frequency window, and operating the RF jammer at the new jamming frequency window.

A related non-transitory computer-readable medium is also provided for a cognitive radio device, such as the one described briefly above. The non-transitory computer-readable medium may have computer-executable instructions for causing the cognitive radio device to perform steps including detecting an RF transmission using the RF detector, determining a plurality of different Quadratic Unconstrained Binary Optimization (QUBO) inputs based upon the detected RF transmission, processing the QUBO inputs with a QUBO objective function to determine a new jamming frequency window, and operating the RF jammer at the new jamming frequency window.

DETAILED DESCRIPTION

The present description is made with reference to the accompanying drawings, in which exemplary embodiments are shown. However, many different embodiments may be used, and thus the description should not be construed as limited to the particular embodiments set forth herein. Rather, these embodiments are provided so that this disclosure will be thorough and complete. Like numbers refer to like elements throughout, and prime notation is used to indicate like elements in different embodiments.

Figure 1:
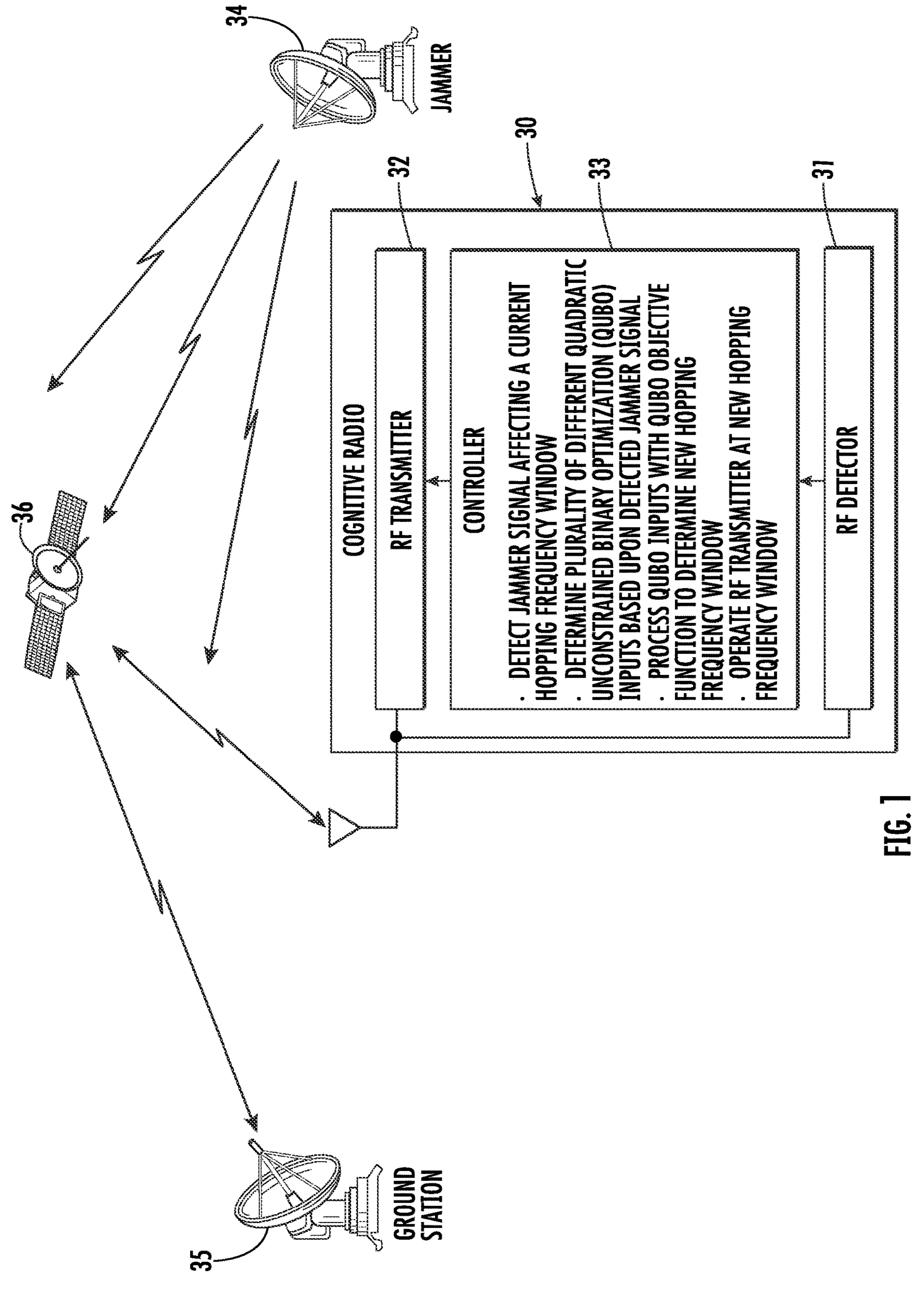
FIG. 1 is a schematic block diagram of a cognitive radio (CR) device in accordance with an example embodiment.

Referring initially to FIG. 1, a cognitive radio (CR) device 30 illustratively includes a radio frequency (RF) detector 31, an RF transmitter 32 having a selectable hopping frequency window, and a controller 33. The controller 33 may be configured to cooperate with the RF detector 31 and RF transmitter 32 to detect a jammer signal from a jammer 34 affecting a current hopping frequency window, determine a plurality of different Quadratic Unconstrained Binary Optimization (QUBO) inputs based upon the detected jammer signal, process the QUBO inputs with a QUBO objective function to determine a new hopping frequency window, and operate the RF transmitter at the new hopping frequency window. In the illustrated example, the CR device 30 communicates with a ground station 35 via a ground-to-air link with a satellite 36 (airplanes or other airborne platforms may also be used), although in other embodiments the CR device 30 may communicate via wireless ground-to-ground links (e.g., ultra-high frequency (UHF) including cellular, wireless local area network (WLAN)/Wi-Fi, etc.) instead of or in addition to ground-to-air links.

Figure 2:
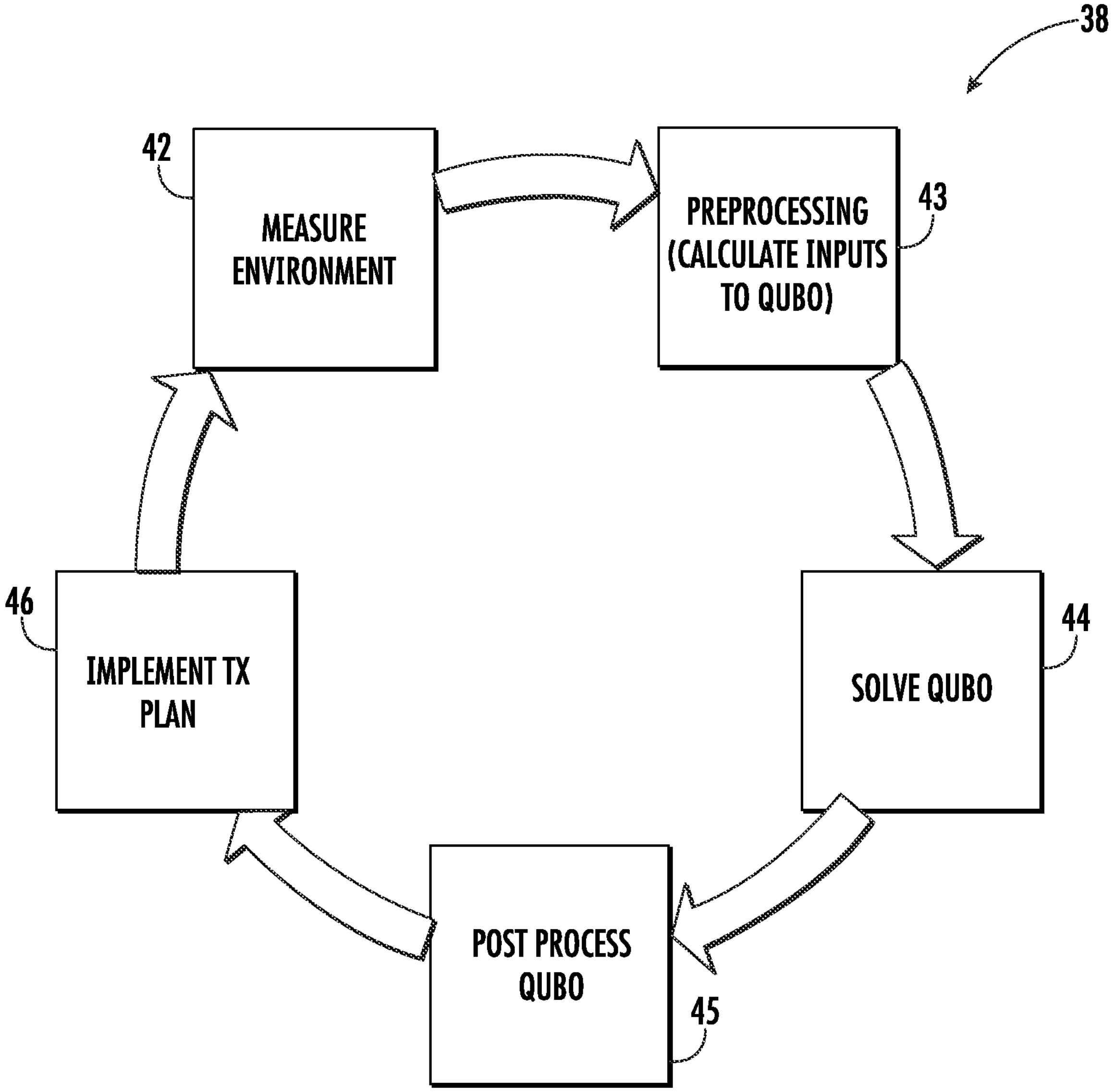
FIG. 2 is a flow diagram illustrating example method aspects associated with the CR device of FIG. 1.

Referring additionally to the flow diagram 38 of FIG. 2, cognitive anti-jam modem analytics may be used to increase signal throughput (goodput, Mbps) of a legitimate transmitter receiver link. The present approach leverages two communications technology areas, namely anti-jamming (AJ) modems and CR, to provide enhanced radio link AJ performance. Typically, most AJ techniques mitigate jamming by frequency spreading alone. However, significant gains may be achieved through a dynamic response to jammer changes and a cognitive processing loop. The present approach may drive jamming interference towards zero using dynamic cognitive radio techniques and processing. This approach may provide enhanced performance (zero or near-zero jamming) by sensing or measuring both the spectral scene and modem performance within the operating environment (Block 42), then pre-processing QUBO inputs (Block 43) and utilizing a QUBO objective function to act, as shown. Moreover, formulating the problem as a QUBO makes it amenable to current quantum optimization techniques. After solving the QUBO objective function (Block 44), post-QUBO process operations may be performed (e.g., avoiding transmitting at certain times, etc.) (Block 45), and the updated transmission plan may be implemented (Block 46) which includes transmitting within the new hopping frequency window.

Figure 3:
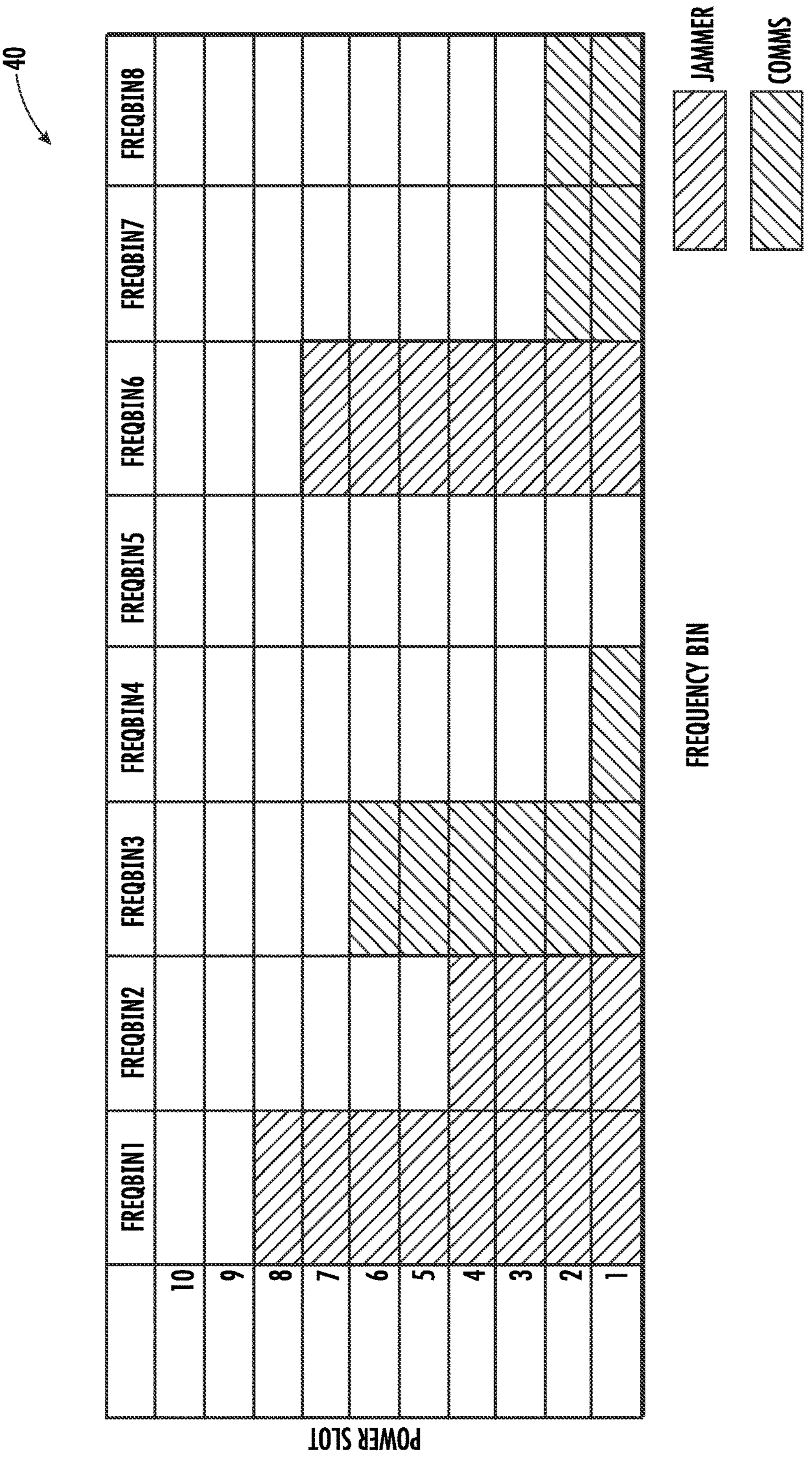
FIG. 3 is a frequency bin diagram for an example implementation of the CR device of FIG. 1.

Referring additionally to the diagram 40 of FIG. 3, the controller 30 uses hysteresis (i.e., a history of emitter and jammer frequencies) and required power/power budget along with a QUBO objective function for determining new hoping frequency windows. An example formulation of a QUBO objective function for the CR device 30 is now described, which has the goals of maximizing Signal-to-Interference-Plus-Noise ratio (SNIR), while at the same time respecting the allotted power budget for the RF transmitter 32. For the QUBO inputs, the controller 33 considers n frequency bins FreqBin1-FreqBin8 (where n=8 in the example of FIG. 3,), indexed by i. Moreover, k is the maximum number of frequencies the transmitter-receiver pair may operate on, and b is the total transmitter power budget.

The power the RF transmitter 32 can transmit into m steps of power is c, so mc=b. That is, the RF transmitter 32 may transmit on a maximum of m power slots at any time (where m=10 in the example of FIG. 3). Power slots are indexed by p, and the detected jammer power in each frequency bin $\delta_i$ in each frequency bin i is shown.

Decision variables may be as follows: $\gamma_i=1$ if the RF transmitter 32 decides to use frequency i, $\gamma_i=0$ otherwise; $x_{ip}=1$ if the RF transmitter sends a "unit" of energy on frequency i, for power slot p=1,2, . . . ,m, $x_{ip}=0$ otherwise (note that if $\gamma_i=0$, then $x_{ip}=0$ for all power slots p); $u_{ip}$ is a binary artificial slack variable introduced to allow the RF transmitter to transmit less power than the total budget ($u_{ip}=1$ if a "placeholder" unit of power is used in bin i, power slot p, $u_{ip}=0$ otherwise); and $\nu_j$ are binary artificial slack variables introduced to allow the legit transmitter to operate on fewer than k frequencies.

Given these inputs and variables, an example QUBO objective function that may be implemented by the controller 33 is as follows:

$$\text{Maximize:}\lambda_1\Sigma_i(c\Sigma_p x_{iy}-\delta_i)^2-\lambda_2(m-\Sigma_{i,p}x_{ip}-\Sigma_{i,p}u_{ip})^2-\lambda_3(\Sigma_i\gamma_i+\Sigma_j\nu_j-k)^2-\lambda_4(\Sigma_i((1-\gamma_i)\Sigma_p x_{ip}))^2 \quad (1)$$

The first term maximizes the squared difference between legitimate RF transmitter 32 power and jammer 34 power in frequency bin i (SNIR). Desirable outcomes are that the RF transmitter 32 puts zero energy into a bin that is dominated by the jammer 34, and that the RF transmitter puts a large quantity of energy into a bin that the jammer is not operating in (i.e., the new hopping frequency window, which in the example of FIG. 2 encompasses portions of frequency bins FreqBin3-FreqBin4 and FreqBin7-FreqBin8).

The second term of equation (1) helps ensure that the RF transmitter 32 respects the overall power budget. The third term helps ensure that the RF transmitter 32 does not operate on more than k frequencies, i.e., providing a penalty for operation on more than k frequencies. The fourth term helps ensure that the controller 33 only puts power into frequencies i that have been selected by $\gamma_i=1$. That is, if $\gamma_i=1$, then $x_{ip}$ is allowed to vary freely between {0,1}. If $\gamma_i=0$, then $x_{ip}=0$, but if $x_{ip}=1$ the objective function is penalized by $\lambda_4$. The $\lambda\geq 0$ coefficients balance the competing objective terms.

In some embodiments, the controller 33 may include quantum computing hardware for performing the above-described QUBO operations, such as a quantum annealer and/or gate-based quantum computing hardware, for example, although in some embodiments classic computing components may be used. Also, the controller 33 need not be co-located with the RF transmitter 32 and/or RF detector 31 in all embodiments, and its various operations may also be distributed among one or more computing devices as well (e.g., local and cloud computing devices) in some embodiments.

Figure 4:
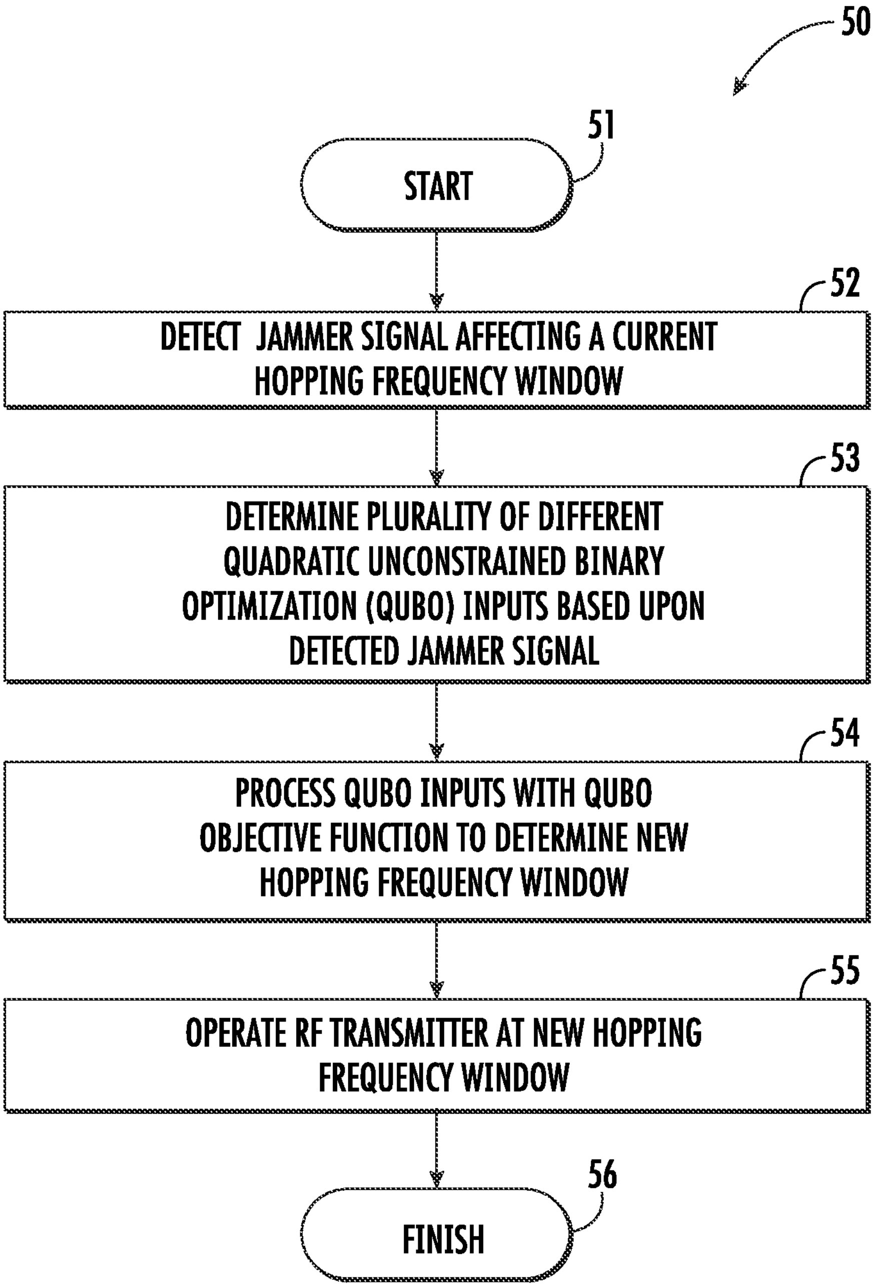
FIG. 4 is a flow diagram illustrating example method aspects associated with the CR device of FIG. 1.

Turning to the flow diagram 50 of FIG. 4, a related method for using the CR device 30 is now described. Beginning at Block 51, the method illustratively includes detecting a jammer signal affecting a current hopping frequency window using the RF detector 31 (Block 52), determining a plurality of different QUBO inputs based upon the detected jammer signal (Block 53), processing the QUBO inputs with a QUBO objective function to determine a new hopping frequency window (Block 54), and operating the RF transmitter 32 at the new hopping frequency window (Block 55), as discussed further above. The method of FIG. 4 illustratively concludes at Block 56.

A related non-transitory computer-readable medium is also provided for the CR device 30. The non-transitory computer-readable medium may have computer-executable instructions for causing the CR device 30 to perform steps including detecting a jammer signal affecting a current hopping frequency window using the RF detector 31, determining a plurality of different QUBO inputs based upon the detected jammer signal, processing the QUBO inputs with a QUBO objective function to determine a new hopping frequency window, and operating the RF transmitter 32 at the new hopping frequency window, as discussed further above.

In some scenarios, the jammer 34 may be a "bad actor" attempting to disrupt transmissions by the CR device 30, but in some cognitive network scenarios the jammer may simply be another legitimate user(s) within the network. However, at any given moment, typically only a relatively small percentage of the spectrum is being used. The above-described approach allows the CR device 30 to advantageously identify unused space outside of that being occupied by others and use that space to transmit data while avoiding interference. This approach allows for a dynamic reconfiguration of wireless networks (e.g., Wi-Fi, cellular, etc.) quickly without human intervention to constantly maximize the use of the spectrum.

Figure 5:
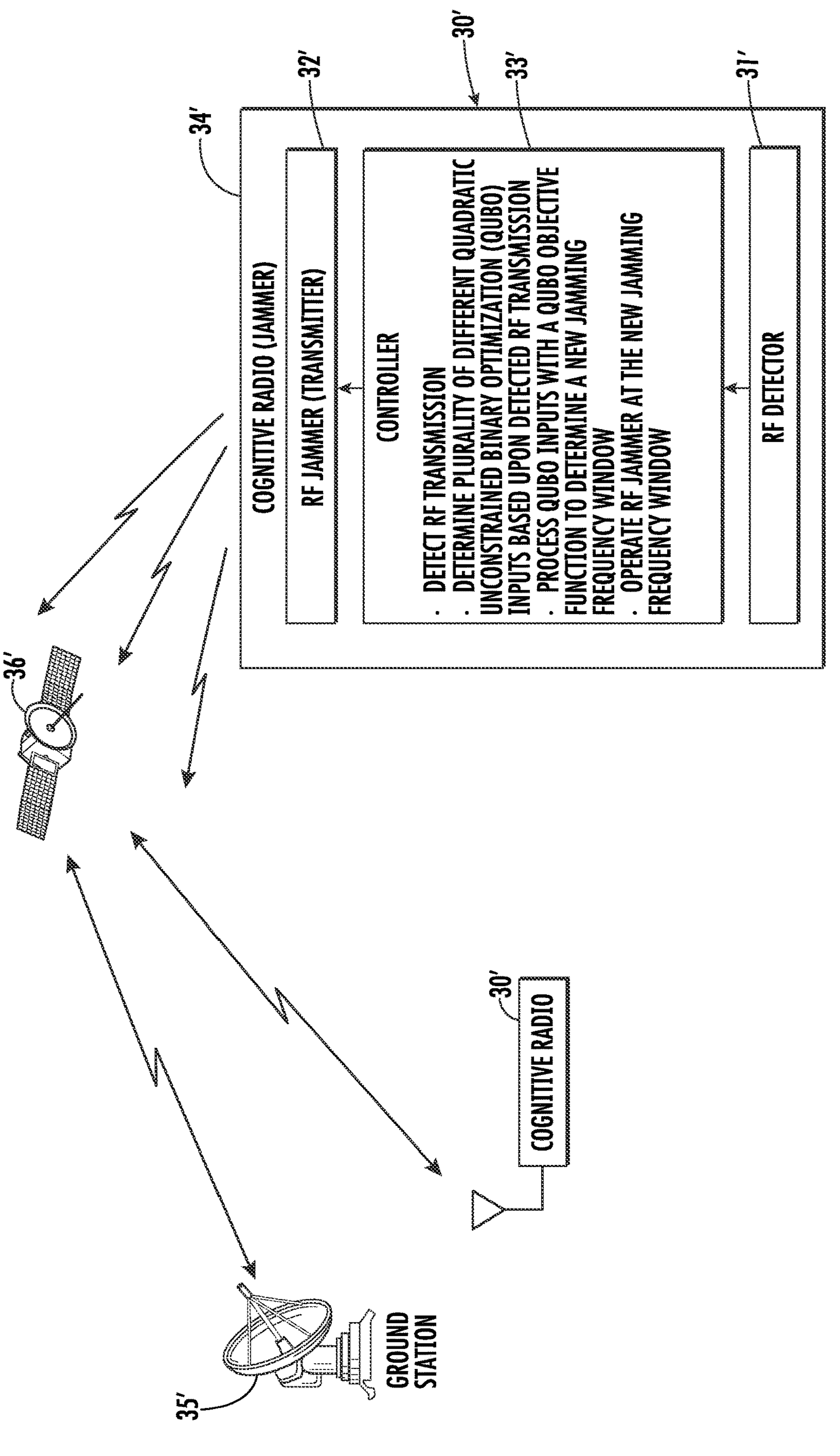
FIG. 5 is a schematic block diagram of a CR device in accordance with another example embodiment.

While in many cases the above-described QUBO techniques will be deployed at the CR device 30 and/or ground station 35 to avoid jammer signals, in some embodiments it may be desirable to utilize these techniques at a jamming device, such as in law enforcement applications, or to establish a security zone (e.g., a vault, etc.) from which users are not permitted to transmit wireless communication signals. Such a configuration is provided in FIG. 5, in which a CR device 34' acts as a jammer to jam another CR device 30'. The CR device 34' illustratively includes an RF detector 31' operable over an RF spectrum, an RF jammer (transmitter) 32' having a selectable jamming frequency window within the RF spectrum, and a controller 33', similar to those discussed above. In the present embodiment, the controller 33' is configured to cooperate with the RF detector 31' and RF jammer 32' to detect an RF transmission (e.g., from the CR device 30'), determine a plurality of different QUBO inputs based upon the detected RF transmission, process the QUBO inputs with a QUBO objective function to determine a new jamming frequency window, and operate the RF jammer at the new jamming frequency window, as similarly described above.

Figure 6:
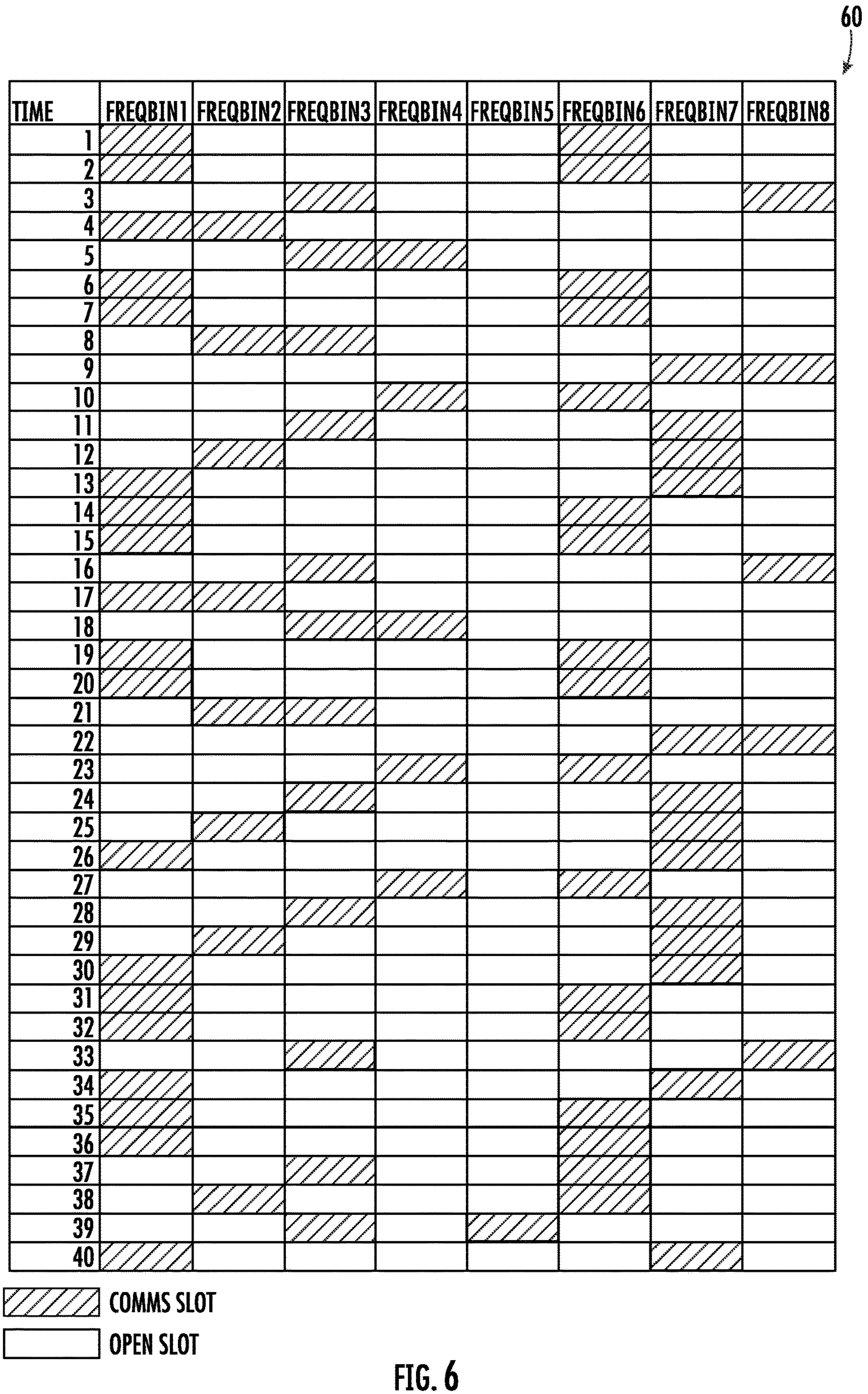
FIG. 6 is a frequency bin diagram for an example implementation of the CR device of FIG. 5.
Figure 7:
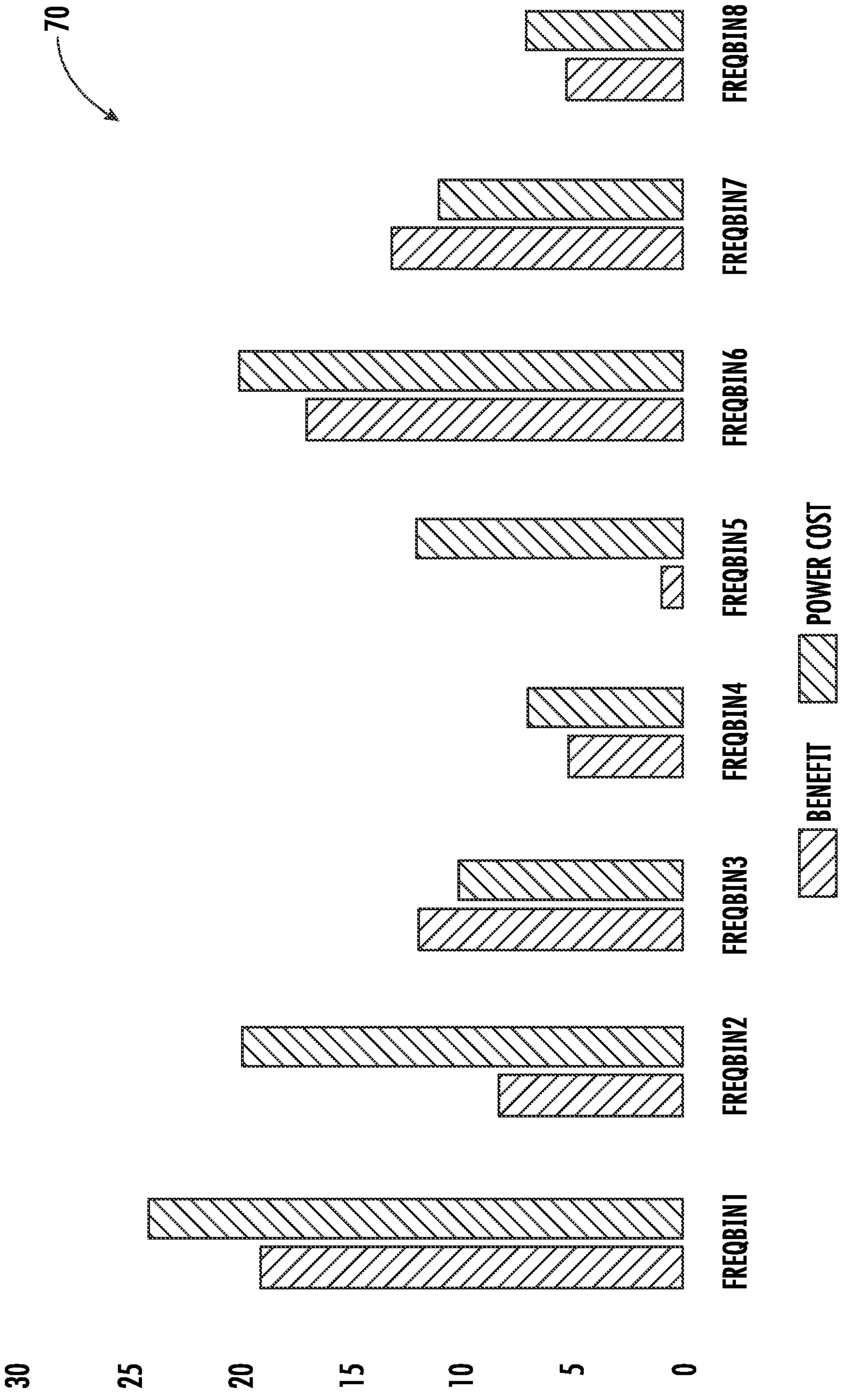
FIG. 7 is a graph illustrating a benefit vs. power cost associated with the frequency bin diagram of FIG. 6 in an example embodiment.

Referring additionally to the frequency bin chart 60 of FIG. 6 and the bar graph 70 of FIG. 7, for the QUBO inputs consider n frequency bins FreqBin1-FreqBin8 (here n=8), indexed by i. Furthermore, k is the maximum number of frequencies the RF transmitter 32' may operate on, and $c_i$ is the benefit of the jammer operating against frequency i. The controller 33' creates a histogram-like count of frequency bins the legitimate transmitter-receiver adversary pair (here the CR device 30' and ground station 35') has been operating in over a recent time window (although the controller may performs a variety of measurements and generate different types of data describing the benefit of operating against frequency bins in the spectrum in different embodiments). Units may include aggregate time, aggregate power, and/or count of hops to frequency bin i. In addition, $\alpha_i$ is the amount of power that a jammer needs to transmit on frequency i to induce a desired bit error rate (BER), e.g., of at least 0.3 (although other values may be used in different embodiments) for the legitimate transmitter-receiver pair, and bis the total jammer power budget. With respect to decision variables, $x_i=1$ if the jammer operates on frequency i, and $x_i=0$ otherwise.

Additionally, the following constraints may be placed on the QUBO objective function. The first constraint may include: introducing binary artificial slack variables u; E $\{0,1\}$, $\forall j=0, \ldots, [\log_2 b]$; reformulating power budget constraints as equality, e.g., $\Sigma_i\alpha_i x_i+\Sigma_j 2^j u_j=b$; and incorporating the squared difference $(\Sigma_i\alpha_i x_i+\Sigma_j 2^j u_j-b)^2$ into the objective function. A second constraint may include: slack binary variables $v_j\in\{0,1\}$, $\forall j=0, \ldots, k$; reformulating as an equality, e.g., $\Sigma_i x_i+\Sigma_j v_j=k$; and incorporating the squared difference $(\Sigma_i x_i+\Sigma_j v_j-k)^2$ into the QUBO objective function.

The resulting formulation of the QUBO objective function may be as follows:

$$\text{Maximize:}\lambda_1(\Sigma_i c_i x_i)-\lambda_2(\Sigma_i\alpha_i x_i+\Sigma_j 2^j u_j-b)^2-\lambda_3(\Sigma_i x_i+\Sigma_j 2^j v_j-k)^2 \tag{2}$$

In equation (2), the first term maximizes the "benefit" of the jammer 34' operating in frequency bin i, the second term helps ensure the jammer respects the overall power budget, and the third term ensures the jammer doesn't operate on more than k frequencies simultaneously. The $\lambda\geq 0$ coefficients balance the competing objective terms.

The graph 70 illustrates an example based upon the frequency bin hysteresis of the CR device 30' shown in the chart 60. In this example, n=8 frequencies, k=3 frequencies that the jammer 34' may use, the power budget is b, the "benefit" of jamming frequency i is $c_i$ as shown by the bar on the left for each frequency bin in the graph 70, while the power "cost" of jamming frequency i is $\alpha_i$ as shown by the bar on the right for each frequency bin (where total "cost" is not to exceed b). In this example, with these inputs the QUBO objective function determines that the "optimal" solution is to select/jam frequencies in bins 3, 7, and 8 due to the cost/benefit tradeoffs. It will be appreciated that there are $\Sigma_{1\leq\ell\leq k}(\ell^n)$ solutions to evaluate, so for large values of n, k quantum processing configurations such as those described above may be particularly advantageous. The process flow described above with respect to FIG. 2 may be similarly utilized by the controller 33' to determine the optimal QUBO solution and implement the appropriate transmission plan accordingly.

Figure 8:
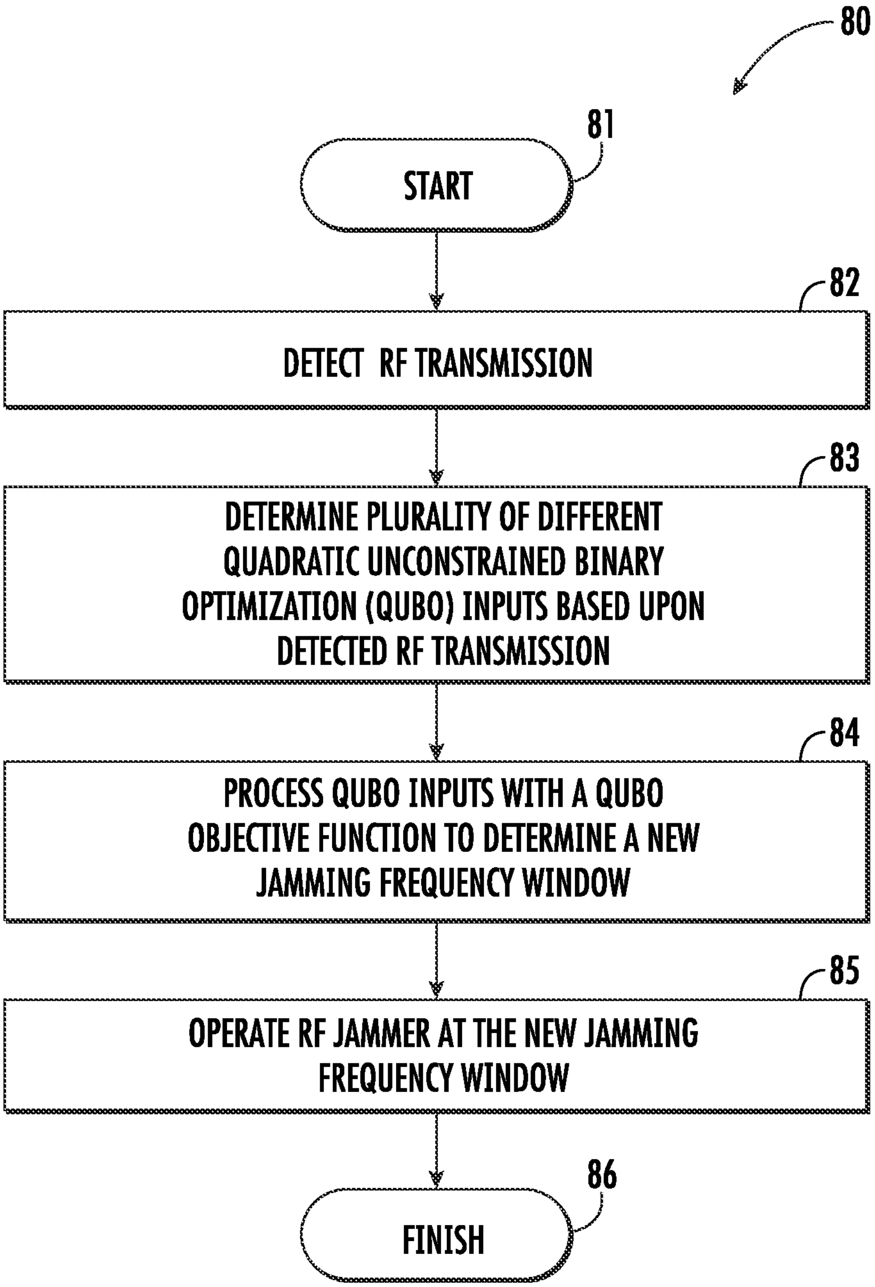
FIG. 8 is a flow diagram illustrating method aspects associated with the CR device of FIG. 5.

A related method for using the CR device 34' as a jammer is now described with reference to the flow diagram 80 of FIG. 8. Beginning at Block 81, the method illustratively includes detecting an RF transmission (e.g., between the CR device 30' and ground station 35') using the RF detector 31' (Block 82), determining a plurality of different QUBO inputs based upon the detected RF transmission (Block 83), processing the QUBO inputs with the QUBO objective function to determine a new jamming frequency window (Block 84), and operating the RF jammer at the new jamming frequency window (Block 85), as discussed further above. The method of FIG. 8 illustratively concludes at Block 86.

A related non-transitory computer-readable medium is also provided for the CR device 30'. The non-transitory computer-readable medium may have computer-executable instructions for causing the CR device 30' to perform steps including detecting an RF transmission using the RF detector 31', determining a plurality of different QUBO inputs based upon the detected RF transmission, processing the QUBO inputs with a QUBO objective function to determine a new jamming frequency window, and operating the RF transmitter 32' at the new jamming frequency window.

Figure 9:
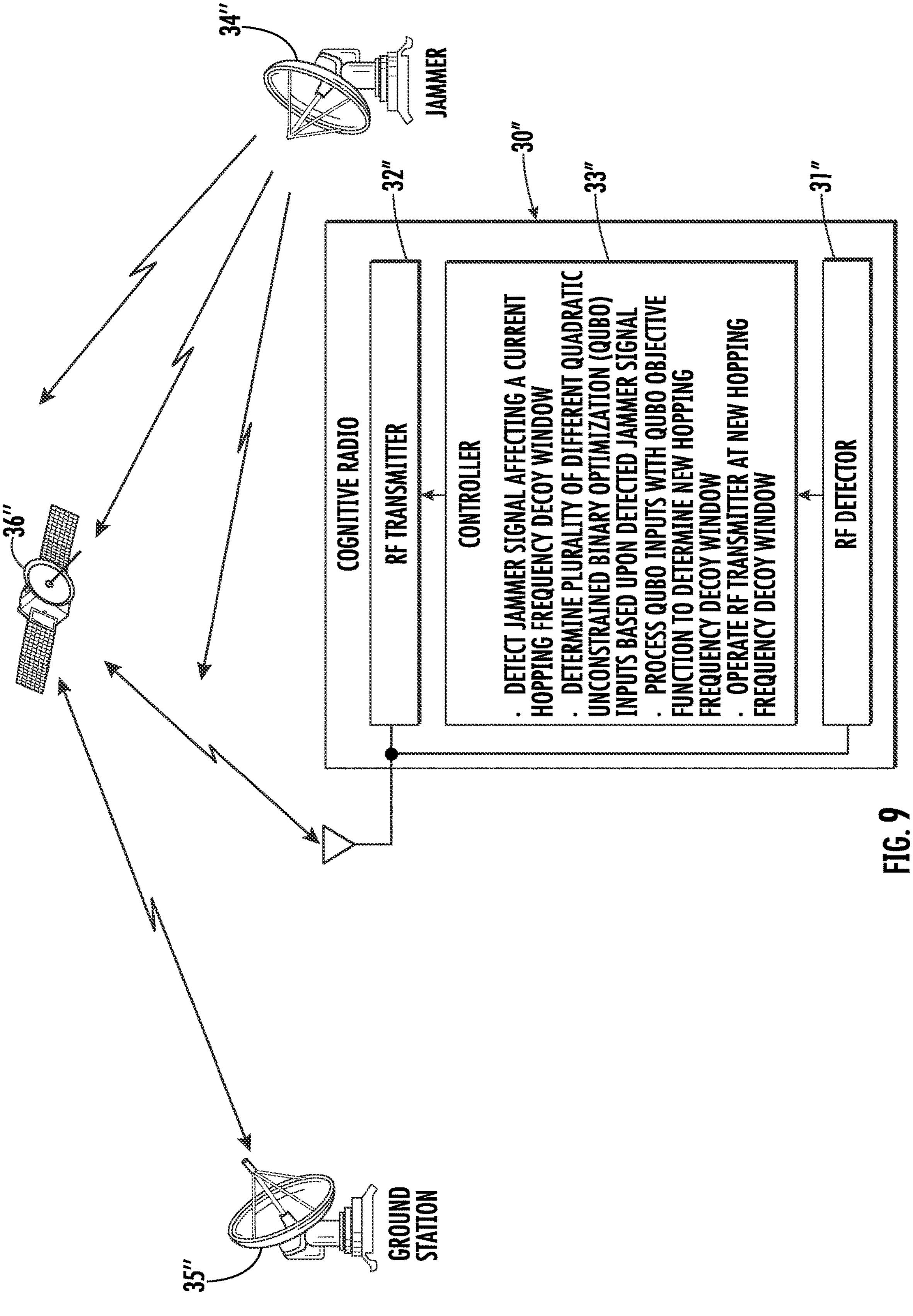
FIG. 9 is a schematic block diagram of a CR device in accordance with yet another example embodiment.

Turning now to FIG. 9, in another example embodiment the CR device 30" may advantageously be used to generate decoy transmissions based upon a QUBO objective function to fool the jammer 34" into transmitting at a particular frequency that will not interfere with normal communications. More particularly, the controller 33" may be configured to cooperate with the RF detector 31" and RF transmitter 32" to detect a jammer signal from the jammer 34" affecting a current hopping frequency decoy window, determine a plurality of different QUBO inputs based upon the detected jammer signal, process the QUBO inputs with a QUBO objective function to determine a new hopping frequency decoy window, and operate the RF transmitter at the new hopping frequency decoy window.

The CR device 30" may operate as a decoy for another transmitter, or it may also transmit communications signals in addition to the decoy signals. An example implementation is now described in which the CR device 30" functions as both a legitimate transmitter-receiver device, while also transmitting decoy frequencies. Transmission of the normal communications signals may also be performed in accordance with the QUBO techniques described above with reference to FIGS. 1-4 in some embodiments.

In this configuration, the controller 33" has an objective of matching jammer power with decoy frequencies, along with constraints of respecting the transmit power budget while maintaining minimum legitimate communications throughput. In this regard, the objective function may be formulated based upon equation (1) above, with additional terms to help provide a minimum of $\ell$ power units dedicated to legitimate communications. Decision variables may be as follows. A variable $\gamma_i=1$ if the RF transmitter 32" decides to use frequency i, $\gamma_i=0$ otherwise. In some embodiments, the RF transmitter 32" may use the frequency as a decoy or for legitimate communications. A variable $x_{ip}=1$ if the RF transmitter 32" transmits a "unit" of energy on frequency i, for power slot p=1,2, . . . ,m for communications, and $x_{ip}=0$ otherwise. A variable $z_{ip}=1$ if the transmitter transmits a "unit" of energy on frequency i, for power slot p=1,2, . . . ,m for a decoy, and $z_{ip}=0$ otherwise. Variables $v_j$ are binary artificial slack variables introduced to allow the legitimate transmitter to operate on fewer than k frequencies (similar to equation (1) above). Variable $u_{ip}$ is a binary artificial slack variable introduced to allow the legit transmitter to transmit less power than the total budget. Variable $u_{ip}=1$ is a "placeholder" unit of power used in bin i, power slot p, and $u_{ip}=0$ otherwise. Lastly, $w_{ip}$ is a binary artificial slack variable introduced to allow the RF transmitter 32" to transmit more power than the minimum required communications transmit power.

Given these inputs and variables, the following objective function may be used:

$$\text{Maximize:}\lambda_1\Sigma_i(c\Sigma_p x_{ip}-\delta_i)^2-\lambda_2(m-\Sigma_{i,p}x_{ip}-\Sigma\Sigma_{ip}z_{ip}-\Sigma_{i,p}u_{ip})^2-\lambda_3(\Sigma_i\gamma_i+\Sigma_j v_j-k)^2-\lambda_4(\Sigma_i((1-\gamma_i)Ep(x_{ip}+z_{ip})))^2-\lambda_5(\Sigma_i\Sigma_p\Sigma_q x_{ip}z_{iq})-\lambda_6\Sigma_i(c\Sigma_p z_{ip}-\delta_i)^2-\lambda_7(\ell-\Sigma_{ip}x_{ip}+\Sigma_{ip}w_{ip})^2 \quad (3)$$

Here again, the first term maximizes the squared difference between legitimate transmitter power and jammer power in frequency bin i (SNIR). The second term helps ensure the RF transmitter 32" respects the overall power budget, including power on decoy frequencies. The third term helps ensure the RF transmitter 32" does not operate on more than k frequencies, and the fourth term helps ensure that power is only put into frequencies i that have been selected by $\gamma_i=1$. The fifth term helps ensure that the RF transmitter 32" does not intermingle decoy frequencies with normal communications frequencies, and the sixth term tries to match jammer energy in frequency bin i for decoy frequencies. Finally, the seventh term helps ensure that the RF transmitter 32" continues to transmit the minimum required f units of power for communications. The $\lambda\geq0$ coefficients balance the competing objective terms.

Figure 10:
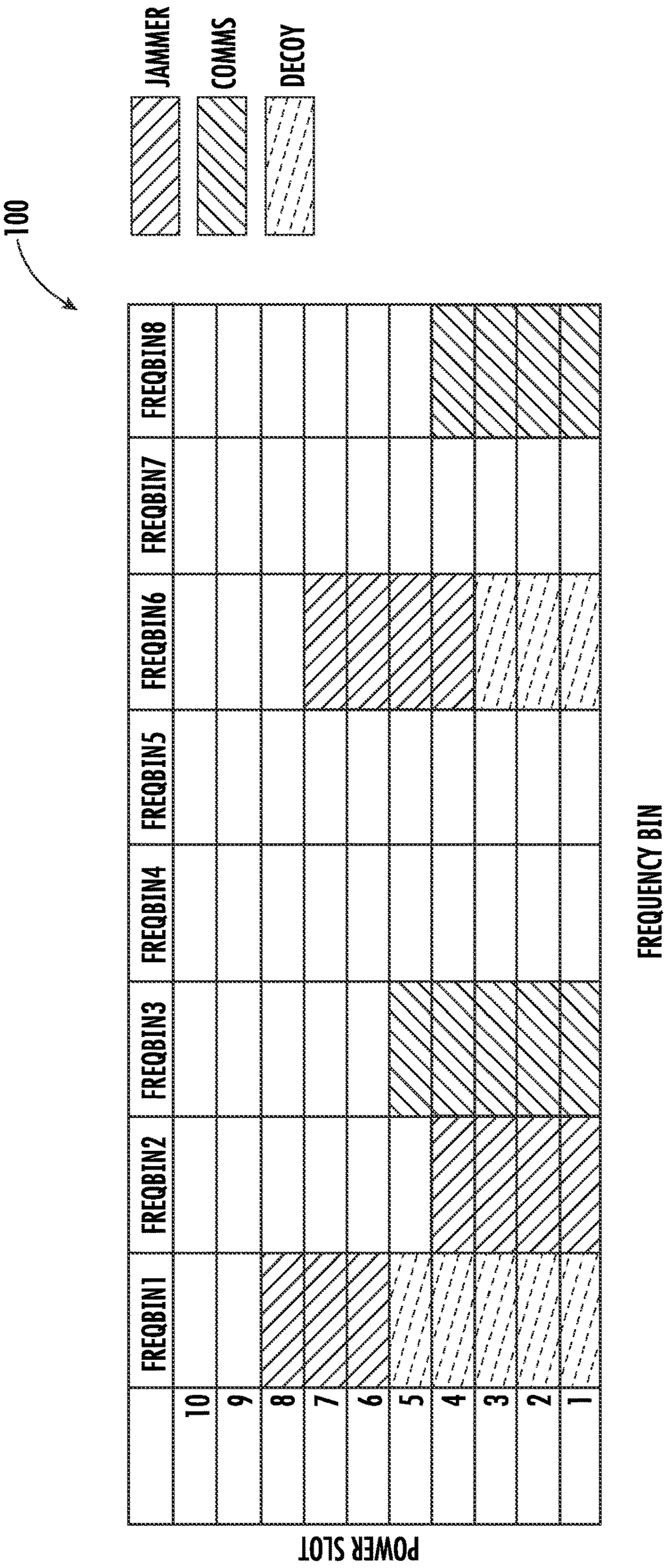
FIG. 10 is a frequency bin diagram for an example implementation of the CR device of FIG. 9.

The graph 100 of FIG. 10 provides an example embodiment solution of equation (3) where a transmitter-receiver pair avoids jammed frequencies, but also places decoy power into frequencies that are being jammed. In the illustrated example, the controller 33" determines based upon the QUBO objective function (3) that the new hopping frequency decoy window should occupy power slots 1-5 of FreqBin1, and slots 1-3 of FreqBin6. The process flow described above with respect to FIG. 2 may be similarly utilized by the controller 33" to determine the optimal QUBO solution and implement the appropriate transmission plan accordingly.

Figure 11:
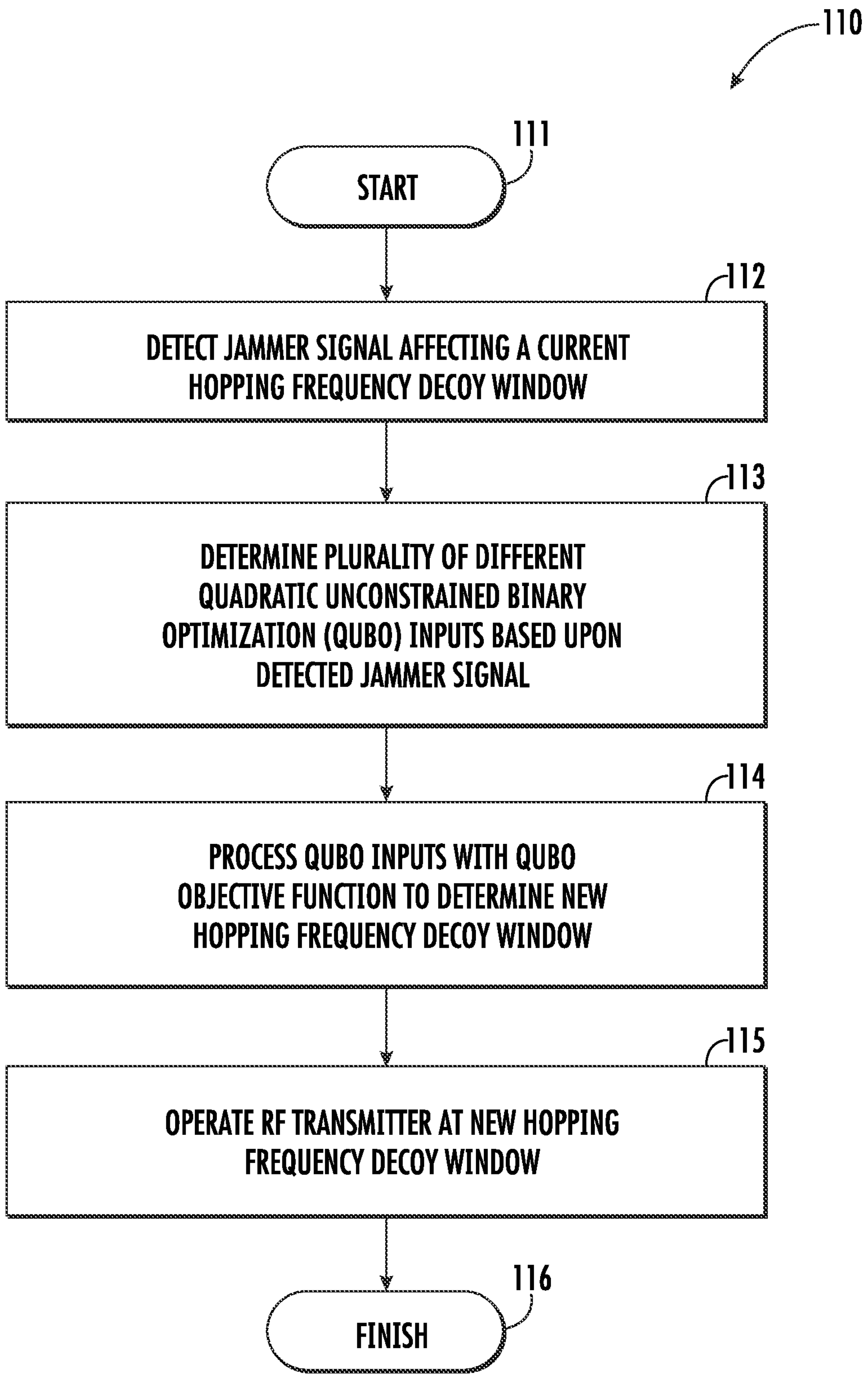
FIG. 11 is a flow diagram illustrating method aspects associated with the CR device of FIG. 9.

A related method for using the CR device 30" is now described with reference to the flow diagram 110 of FIG. 11. Beginning at Block 111, the method illustratively includes detecting a jammer signal affecting a current hopping frequency decoy window (Block 112), determining a plurality of different QUBO inputs based upon the detected jammer signal (Block 113), processing the QUBO inputs with a QUBO objective function to determine a new hopping frequency decoy window (Block 114), and operating the RF transmitter 32" at the new hopping frequency decoy window (Block 115), as discussed further above. The method of FIG. 11 illustratively concludes at Block 116.

A related non-transitory computer-readable medium is also provided for the CR device 30". The non-transitory computer-readable medium may have computer-executable instructions for causing the CR device 30" to perform steps including detecting a jammer signal affecting a current hopping frequency decoy window, determining a plurality of different QUBO inputs based upon the detected jammer signal, processing the QUBO inputs with a QUBO objective function to determine a new hopping frequency decoy window, and operating the RF transmitter 32" at the new hopping frequency decoy window, as discussed further above.

This application is related to co-pending U.S. Patent application Ser. No. 18/464,692, filed Sep. 11, 2023, and U.S. patent application Ser. No. 18/464,723, filed Sep. 11, 2023, which are also from the present Applicant and are hereby incorporated herein in their entireties by reference. Further details regarding cognitive radio systems are provided in co-pending U.S. Pat. No. 12,176,941, issued Dec. 24, 2024, and U.S. Pat. No. 12,463,680, issued Nov. 4, 2025, also by the present Applicant, which are hereby incorporated herein in their entireties by reference.

Many modifications and other embodiments will come to the mind of one skilled in the art having the benefit of the teachings presented in the foregoing descriptions and the associated drawings. Therefore, it is understood that the disclosure is not to be limited to the specific embodiments disclosed, and that modifications and embodiments are intended to be included within the scope of the appended claims.

The invention claimed is:

1. A cognitive radio device comprising:

a radio frequency (RF) detector operable over an RF spectrum;

an RF jammer having a selectable jamming frequency window within the RF spectrum; and a controller configured to cooperate with the RF detector and RF jammer to detect an RF transmission, determine a plurality of different Quadratic Unconstrained Binary Optimization (QUBO) inputs based upon the detected RF transmission, process the QUBO inputs with a QUBO objective function to determine a new jamming frequency window, and operate the RF jammer at the new jamming frequency window.

2. The cognitive radio device of claim 1 wherein one of the QUBO inputs corresponds to a difference between a power level associated with the RF transmitter and a power level associated with the RF transmission.

3. The cognitive radio device of claim 1 wherein one of the QUBO inputs corresponds to an RF power budget for the RF jammer.

4. The cognitive radio device of claim 1 wherein the new jamming frequency window comprises a plurality of new frequencies; and wherein one of the QUBO inputs corresponds to a number of new frequencies.

5. The cognitive radio device of claim 1 wherein the controller is configured to operate based upon a machine learning (ML) model.

6. The cognitive radio device of claim 1 wherein the controller is configured to determine the plurality of different QUBO inputs based upon a hysteresis of switching of the detected RF transmission.

7. The cognitive radio device of claim 1 wherein the RF spectrum is within the ultra-high frequency (UHF) band.

8. A method for using a cognitive radio device comprising a radio frequency (RF) detector operable over an RF spectrum and an RF jammer having a selectable jamming frequency window within the RF spectrum, the method comprising:

detecting an RF transmission using the RF detector;

determining a plurality of different Quadratic Unconstrained Binary Optimization (QUBO) inputs based upon the detected RF transmission;

processing the QUBO inputs with a QUBO objective function to determine a new jamming frequency window; and operating the RF jammer at the new jamming frequency window.

9. The method of claim 8 wherein one of the QUBO inputs corresponds to a difference between a power level associated with the RF transmitter and a power level associated with the RF transmission.

10. The method of claim 8 wherein one of the QUBO inputs corresponds to an RF power budget for the RF jammer.

11. The method of claim 8 wherein the new jamming frequency window comprises a plurality of new frequencies; and wherein one of the QUBO inputs corresponds to a number of new frequencies.

12. The method of claim 8 wherein determining comprises determining the plurality of different QUBO inputs based upon a hysteresis of switching of the detected RF transmission.

13. The method of claim 8 wherein determining comprises determining the plurality of different QUBO inputs based upon a machine learning (ML) model.

14. The method of claim 8 wherein the RF spectrum is within the ultra-high frequency (UHF) band.

15. A non-transitory computer-readable medium for a cognitive radio device comprising a radio frequency (RF) detector operable over an RF spectrum and an RF jammer having a selectable jamming frequency window within the RF spectrum, the non-transitory computer-readable medium having computer-executable instructions for causing the cognitive radio device to perform steps comprising:

detecting an RF transmission using the RF detector;

determining a plurality of different Quadratic Unconstrained Binary Optimization (QUBO) inputs based upon the detected RF transmission;

processing the QUBO inputs with a QUBO objective function to determine a new jamming frequency window; and operating the RF jammer at the new jamming frequency window.

16. The non-transitory computer-readable medium of claim 15 wherein one of the QUBO inputs corresponds to a difference between a power level associated with the RF transmitter and a power level associated with the RF transmission.

17. The non-transitory computer-readable medium of claim 15 wherein one of the QUBO inputs corresponds to an RF power budget for the RF jammer.

18. The non-transitory computer-readable medium of claim 15 wherein the new jamming frequency window comprises a plurality of new frequencies; and wherein one of the QUBO inputs corresponds to a number of new frequencies.

19. The non-transitory computer-readable medium of claim 15 wherein determining comprises determining the plurality of different QUBO inputs based upon a hysteresis of switching of the detected RF transmission.

20. The non-transitory computer-readable medium of claim 15 wherein determining comprises determining the plurality of different QUBO inputs based upon a machine learning (ML) model.

21. The non-transitory computer-readable medium of claim 15 wherein the RF spectrum is within the ultra-high frequency (UHF) band.

* * * * *